J. A. VIELE.
PNEUMATIC FRICTION CLUTCH.
APPLICATION FILED OCT. 6, 1911.
1,045,918.
Patented Dec. 3, 1912.
5 SHEETS—SHEET 1.
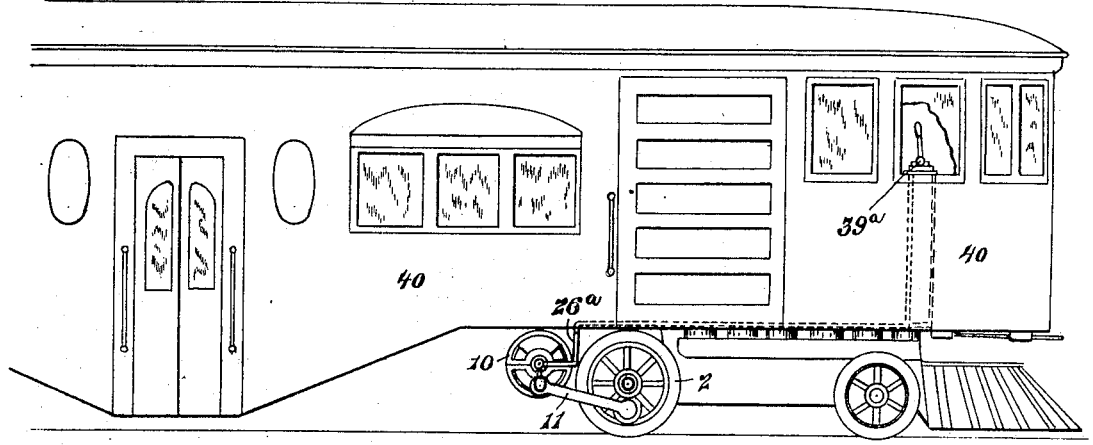
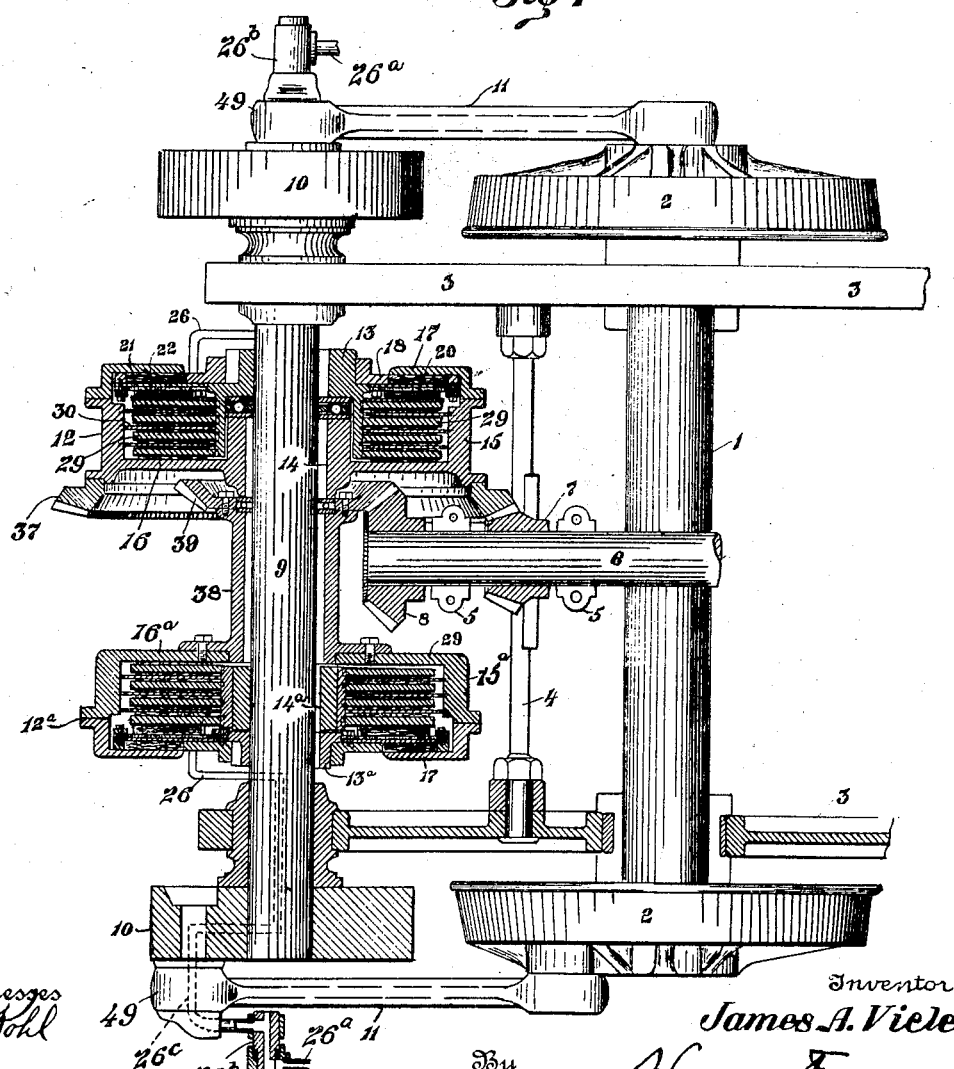
Witnesses
Inventor
James A. Viele
By
Harry Frease
Attorney

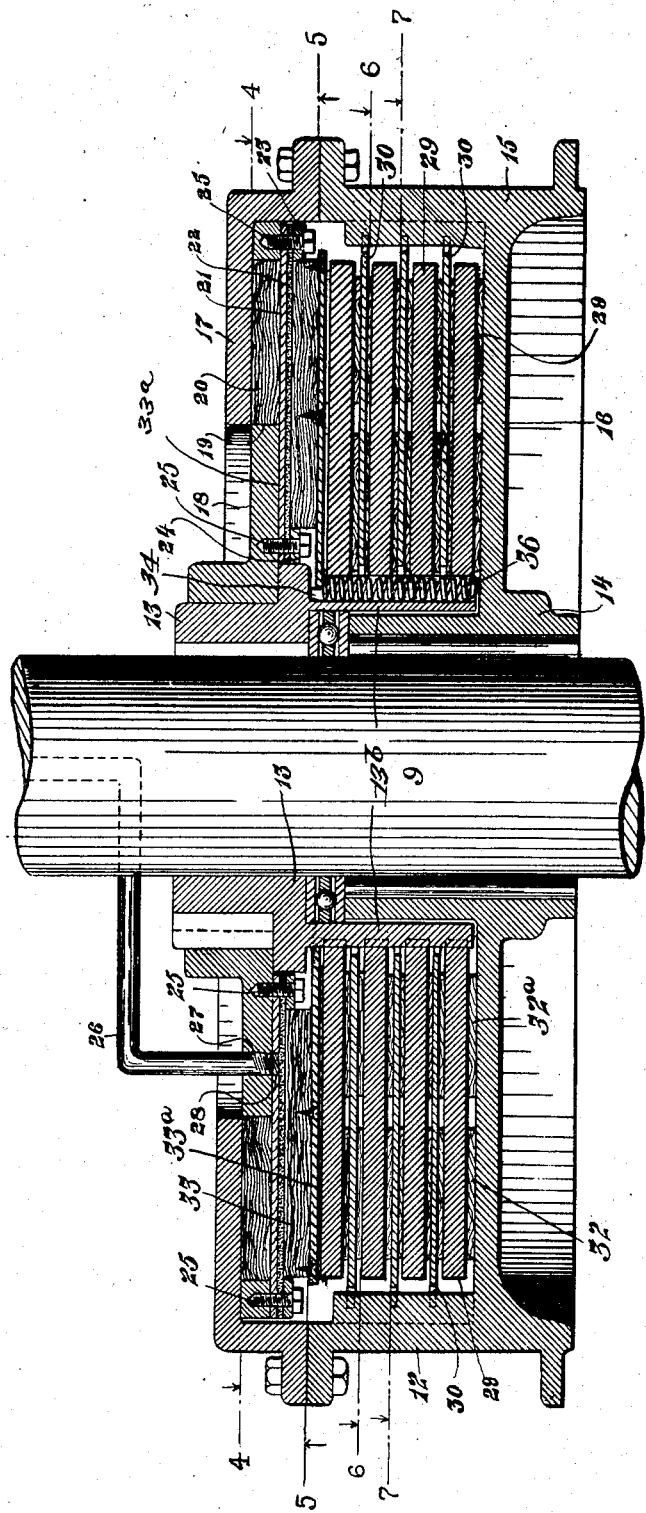

J. A. VIELE.
PNEUMATIC FRICTION CLUTCH.
APPLICATION FILED OCT. 6, 1911.

1,045,918.

Patented Dec. 3, 1912.
5 SHEETS—SHEET 4.

Witnesses

Inventor
James A. Viele
By Harry Frease
Attorney

J. A. VIELE.
PNEUMATIC FRICTION CLUTCH.
APPLICATION FILED OCT. 6, 1911.

1,045,918.

Patented Dec. 3, 1912.
5 SHEETS—SHEET 5.

Witnesses
R. F. Kohl
Ruth A. Miller

Inventor
James A. Viele
By Harry Frease
Attorney

UNITED STATES PATENT OFFICE.

JAMES A. VIELE, OF WARREN, PENNSYLVANIA.

PNEUMATIC FRICTION-CLUTCH.

1,045,918.  Specification of Letters Patent.  Patented Dec. 3, 1912.

Application filed October 6, 1911. Serial No. 653,136.

*To all whom it may concern:*

Be it known that I, JAMES A. VIELE, a citizen of the United States, residing at Warren, in the county of Warren and State of Pennsylvania, have invented certain new and useful Improvements in Pneumatic Friction-Clutches, of which the following is a specification.

The invention relates to a pneumatic friction clutch and an air controlling valve for the transmission gearing of a motor car, wherein the power is produced by an internal combustion engine or other form of motor and is transmitted by the gearing to the driving wheels of the vehicle.

The object of the improvement is to provide a friction clutch adapted to be operated by compressed air or the like for use in the transmission gearing of heavy cars built for use on railroads wherein the ponderous weight of the car, the rigidity of the track and the roadbed, and the burdens, shocks and vibrations imposed upon the gearing, render it necessary to take up the work of starting, propelling and stopping the car, and varying the speed thereof, in a gradual manner without unduly shocking or straining the gearing or jolting the car.

The invention furthermore pertains to the adaptation of friction disk clutches for a pneumatic operation whereby the clamping of the disks can be constantly cushioned by the elasticity of compressed air; and combined therewith a controlling valve whereby the pressure of the air can be applied to the clutch in a varying degree at the will of the operator.

The general objects of the invention, thus set forth in general terms, as embodied with a preferred form of multiple-disk clutches, are attained by the mechanism, construction and arrangement illustrated in the accompanying drawings, forming part hereof, in which—

Figure 4:
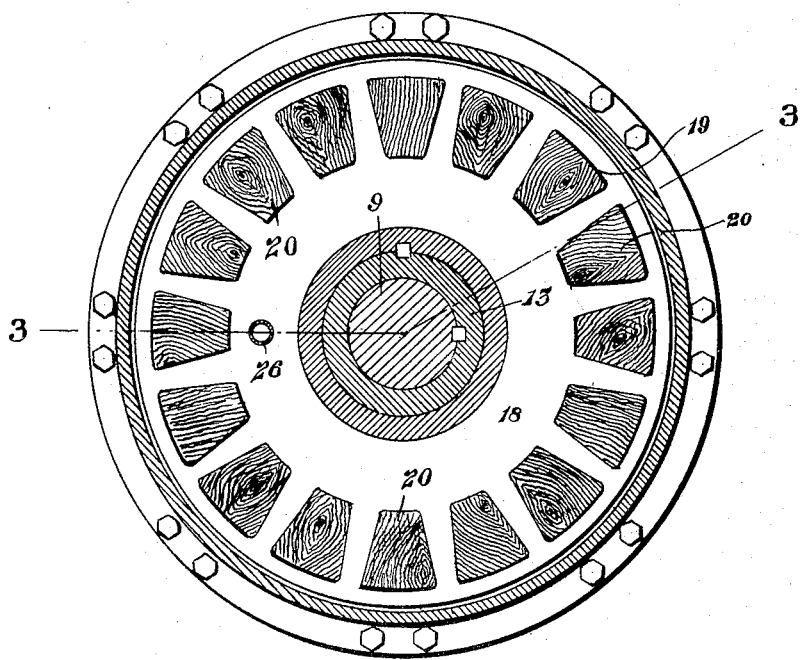
Figure 5:
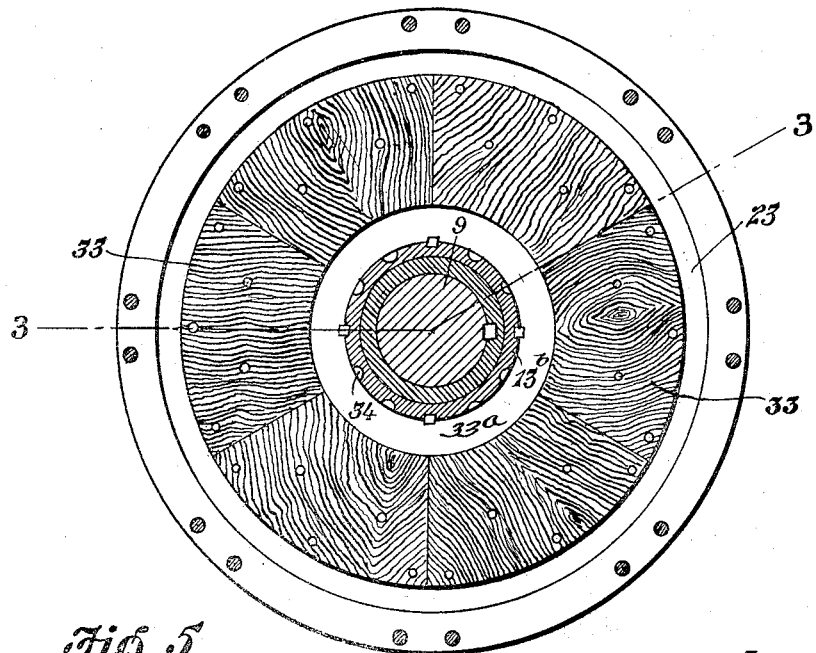
Figure 6:
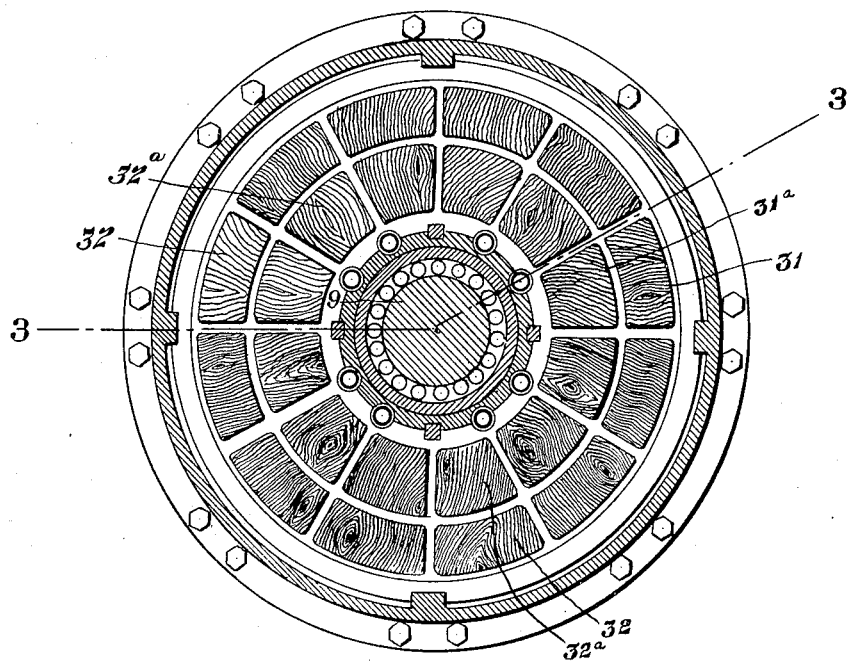
Figure 7:
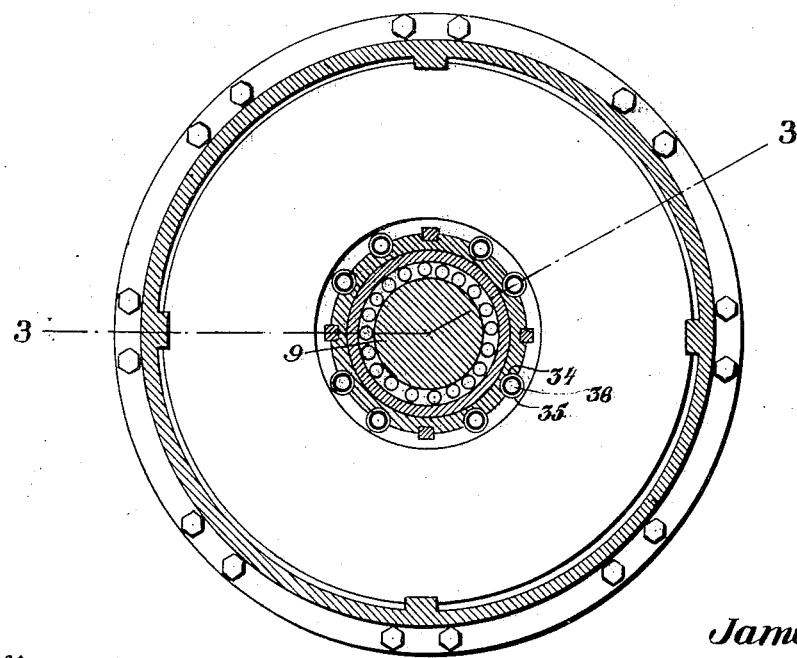
Figure 8:
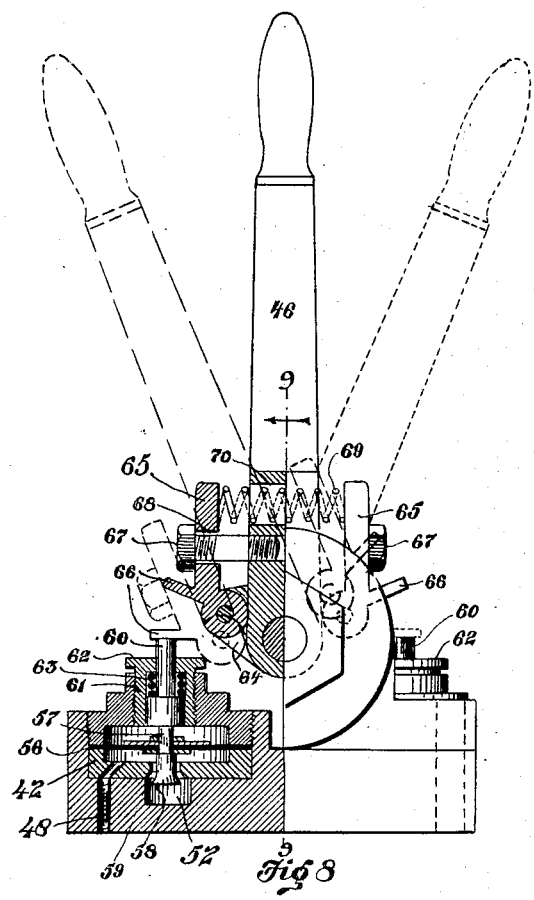
Figure 9:
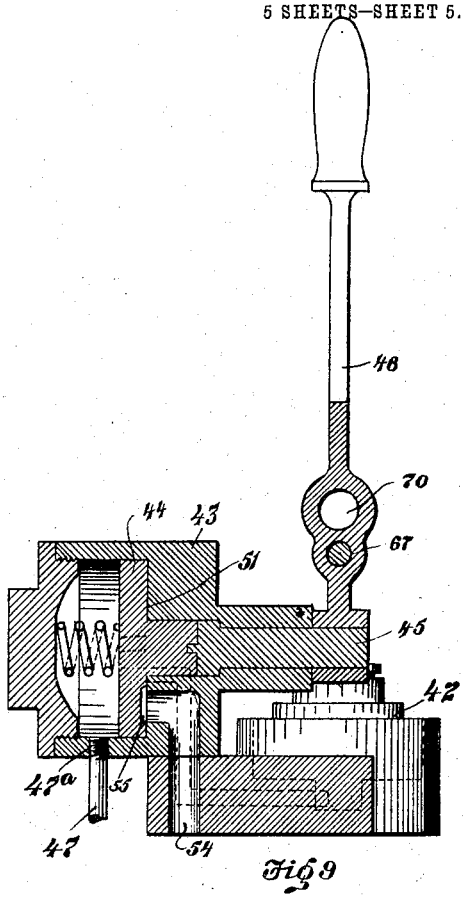
Figure 10:
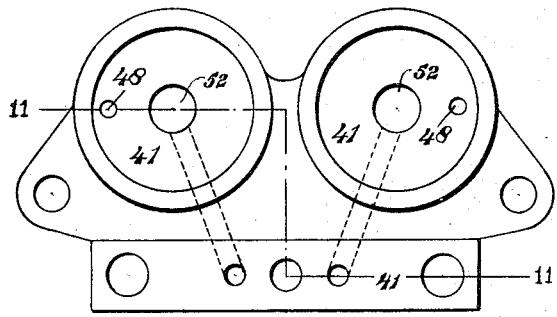
Figure 12:
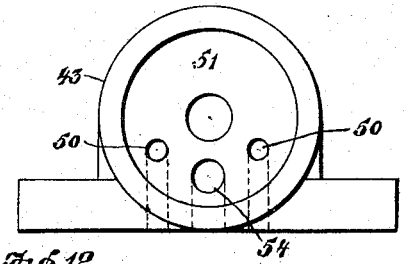
Figure 11:
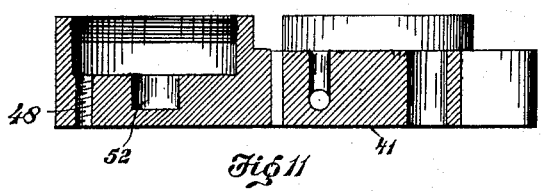
Figure 13:
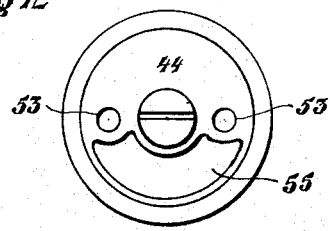

Figure 1 is an outline side elevation of the forward portion of a motor car, showing the location of the operating parts; Fig. 2, a fragmentary plan view of the rear portion of the motor truck, showing the multiple-disk clutches and some adjacent parts in section; Fig. 3, a section of one multiple-disk clutch on line 3—3, Figs. 4 to 6, inclusive; Fig. 4, a section of the clutch on line 4—4, Fig. 3, showing the plan of the driving head thereof; Fig. 5, a section of the clutch on line 5—5, Fig. 3, showing the arrangement of the abutment disk-ring; Fig. 6, a section of the clutch on line 6—6, Fig. 3, showing a plan of one centrally feathered driving disk-ring; Fig. 7, a section of the clutch on line 7—7, Fig. 3, showing the plan of one peripherally feathered driven disk-ring; Fig. 8, an end view, one side half in section, of the controlling valve; Fig. 9, a longitudinal section of the controlling valve on line 9—9, Fig. 8; Fig. 10, a detached plan view of the base plate of the controlling valve; Fig. 11, a section of the valve base plate on line 11—11, Fig. 10; Fig. 12, a detached end view of the valve case, showing the closure and the valve removed therefrom; and Fig. 13, a detached inner end view of the valve disk, showing the arrangement of the ports therein.

Similar numerals refer to similar parts throughout the drawings.

The transverse axle 1 of the drive wheels 2 of the car is journaled in the side girders 3 of the truck, one of the cross girders 4 of which truck carries the bearings 5 for the longitudinal driving shaft 6, which is located above the drive-wheel axle 1; between which bearings is located the low speed pinion 7 and in rear of the rearmost bearing is located the high speed pinion 8 for the transmission gearing, which pinions are keyed to the driving shaft.

The transverse countershaft 9 of the transmission gearing is journaled in the side girders 3 of the truck frame, in the horizontal plane of the driving shaft and adjacent to the free end thereof, on the ends of which countershaft are keyed or otherwise secured the crank disks 10 which are geared to the drive wheels by the connecting bars 11.

Two multiple-disk friction clutches 12 and 12ᵃ are mounted on the transverse countershaft, one on each side of the line of the driving shaft. Each clutch includes a driving member 13 or 13ᵃ keyed to the countershaft, and a driven member 14 or 14ᵃ journaled on the countershaft; the driven member being shaped as a cylindric case 15 or 15ᵃ having an integral head closure 16 or 16ᵃ at one end and a detachable inturned metal flange 17 partially closing the other end, within which flange is located the driving head 18 which is feathered on the driving member 13 of the clutch, the outer portion of which driving head is overlapped by the inturned annular flange 17 of the driven member.

The overlapped portion of the driving head 18 is provided with a series of apertures 19 in which are located a series of wooden blocks 20, the outer sides of which blocks protrude slightly beyond the face of the driving head and receive the abutment and friction of the inner face of the overlapping flange 17 of the driven member.

Two ring diaphragms 21 and 22 are secured face to face on the inner side of the driving head 18 by means of the washers 23 and 24 applied to the edges of the inner diaphragm 22 and the bolts 25 passed through the washers and the diaphragms into the body of the driving head so as to form a tight annular joint around each edge of the diaphragms. The outer diaphragm 21 is preferably made of sheet metal or other inflexible material, while the inner ring is made of leather or other tough and flexible material, and a tube 26 is passed through the aperture 27 in the driving head and screwed into a corresponding aperture 28 in the outer diaphragm 21, through which tube compressed air is supplied between the adjacent faces of the diaphragms to force the inner flexible one away from the outer relatively rigid one, thus making of the two diaphragms, collectively considered, an inflatable diaphragm.

The cast-metal driving disk-rings 29 are feathered in their inner edges on the sleeve portion 13$^b$ of the driving member of the clutch, and the intervening plate-metal driven disk-rings 30 are feathered by their peripheries to the cylindric wall 15 of the driven member thereof; which driving disks 29 are provided with series of apertures 31 and 31$^a$ in which are located a series of wooden blocks 32 and 32$^a$, the sides of which protrude beyond the sides of the driving disks and abut and receive the friction of the faces of the driven disks.

An abutment disk-ring is located between the flexible diaphragm and the adjacent driving-disk, which abutment ring is preferably made in sections of wooden blocks 33 secured to the side of the sheet metal backing 33$^a$, which wooden blocks 33 abut the inflatable diaphragm and which sheet metal backing 33$^a$ abuts the wooden blocks in the adjacent driving disk 29.

The parts are so arranged that the driving and driven disks and the abutment ring will freely fill the space between the integral head 16 of the driven clutch member 14 and the inflatable diaphragm 22 when the same is deflated; but that, when the diaphragm is inflated by compressed air, the driving and driven disks will be tightly clamped against each other. The series of grooves 34 is preferably provided along the sleeve portion 13$^b$ of the clutch driving member, and a corresponding series of notches 35 are provided in the inner edges of the driving disks, in which grooves and notches are located the compression springs 36 each having one end abutting the integral head 16 of the clutch driving member and one half of the other end abutting the face of the sheet metal backing 33$^a$ of the abutment ring, which springs serve to deflate the diaphragm, if necessary, and to separate the parts, when the pressure of the air is released.

On the cylindric case 15 of one driven clutch member is formed or secured the bevel gear wheel 37 which meshes with the bevel pinion 7 on the driving shaft for low speed; and on the cylindric case 15$^a$ of the other driven clutch member is formed or secured the extension sleeve 38 which is journaled on and extends along the countershaft across and beyond the free end of the driving shaft and has formed or secured on its end the bevel gear wheel 39, of less diameter than the gear wheel 37, which meshes with the bevel pinion 8 on the driving shaft, for high speed, on the same side of the driving shaft as said gear wheel 37, so that both wheels will be rotated in the same direction by the respective pinions.

By this construction and arrangement, it is evident that, when the driving shaft is rotated and the clutch-disks are not clamped together, the driven members of both clutches will rotate freely on the countershaft at different speeds according to the relative diameter of the gear wheels, but that when the disks of either one or the other clutch are clamped together, as by compressed air introduced through the tube 26, this clutch will rotate the countershaft according to the speed of its gear wheel, which rotation is communicated to the drive wheels 2 of the car truck by means of the crank-disks 10 and the connecting bars 11.

The air controlling valve 39$^a$ is conveniently located in the motorman's compartment at the forward end of the car 40, as shown in Fig. 1, which valve is composed generally of the base plate 41 having two reducing-valve cases 42 formed or secured thereon and a cut-off-valve case 43 formed or mounted thereon, a disk-valve 44 in the cavity of the cut-off-valve case, the stem 45 journaled in one end of the disk valve, and the operating lever 46 secured on the free end of the valve stem. Compressed air is received from a reservoir, not shown, into the cavity of the cut-off valve case through the inlet tube 47 screwed into the aperture 47$^a$ in the wall of the case, and compressed air is carried from the cavities of the reducing-valve cases 42 by the tubes 26$^a$ screwed into the apertures 48 in the base plate and extended through the wall of the reducing-valve cases. Communication between the tubes 26ª leading from the respective reducing-valve chambers and the tubes 26 of the respective clutches, is completed by the swivel joint 26ᵇ formed in the tube 26ª co-axial with the countershaft, and the duct 26ᶜ formed in the wrist pin 49, the crank disk 10 and the countershaft 9.

Two ports 50 extend through the head 51 of the stop-valve case and lead from the cavity thereof to the respective chambers 52 formed in the base plate below the reducing-valve cases; and the disk valve 43 which normally abuts the inner face of the same head 51 of the stop-valve case, is provided with the apertures 53, which apertures do not register with the openings of the ports 50 when the operating lever 45 is in upright position, but are so located that one aperture will register with one port when the lever is rotated in one direction, as shown by broken lines in Fig. 8, and that the other aperture will register with the other port when the lever is rotated in the other direction, as shown by dotted lines in the same figure. The exhaust port 54 also leads through the head 51 of the stop valve case from the cavity thereof, and a corresponding circular-arc recess 55 is provided in the face of the stop valve disk, which recess is adapted to register with both ports 50 when the operating lever is in upright position, but is closed by the face of the disk with respect to either port when the corresponding disk aperture registers therewith, so that air is freely exhausted from either one or both ports when the compressed air is cut off therefrom by the disk valve.

A transverse diaphragm 56 is secured by its periphery in the cavity of each reducing-valve case, to which diaphragm is secured the axial stem 57, on the lower end of which stem is formed or secured the conical valve 58 which protrudes through the corresponding conical seat aperture 59 in the lower end of the case; and the free end of the stem extends upward through and protrudes above the upper end of the case. The stem 57 is provided with the piston 60 operating in the cylinder 61 adjustably secured in the upper end of the case, between which piston and the head 62 of the cylinder is located the spiral compression spring 63 which acts to resist an upward flexure of the diaphragm and thereby controls the operation of the reducing valve.

Each chamber 52 in the base plate 40 communicates with the seat-aperture 59 in the bottom of the corresponding reducing-valve case, and it is evident that, when air is admitted to the chamber by the rotation of the operating lever in the proper direction, the pressure of the same through the outlet aperture 48 from the cavity of the reducing valve case will be controlled by the action of the compression spring 63 in the usual manner for valves of this character. Between the ears as 64 formed or secured on opposite sides of the operating lever are pivoted presser arms 65 carrying the presser feet 66, which presser feet are adapted to impinge the upper end of the corresponding reducing valve stems when the operating lever has been rotated to open the corresponding port 50.

Each presser arm extends upward at an interval from the side of the operating lever and substantially parallel therewith, and is stopped against rotation from the lever by the head of the stop bolt 67, the shank of which bolt is passed through the slotted aperture 68 in the arm and is screwed into the side of the lever. The auxiliary compression spring 69 extends freely through the aperture 70 formed in the operating lever and its ends abut the inner faces of the free ends of the presser arms 65; and it is evident that, when one presser foot 66 impinges the stem of the corresponding reducing valve by a rotation of the operating lever in the proper direction, the pressure of the foot on the stem by a further rotation of the lever in the same direction, will be cushioned by the compression of the auxiliary spring 69 between the free ends of the presser arms 65, the free end of the arm carrying the particular presser foot being deflected toward the operating lever and the free end of the opposite presser arm being stopped by the head of the bolt 67.

By this mechanism, construction and arrangement, it is evident that, after the stop valve has been opened by a rotation of the operating lever in one direction, a further rotation of the lever in the same direction serves to add the strength of the auxiliary compression spring 69 to the strength of the reducing-valve compression spring 63, to resist the closure of the reducing valve 57, thereby increasing the pressure of the air which may pass through the reducing valve, substantially at the will of the operator.

To start the car, the motor, not shown, being in operation to rotate the driving shaft, and the diaphragms of both clutches being deflated so that the driving members thereof rotate freely on the countershaft, the operating lever of the controlling valve is rotated in the proper direction, preferably rearward, to open the port leading through the reducing valve to the clutch 12 carrying the low speed gear wheel. The pressure of air inflates the diaphragms of this clutch and tends to clamp the friction disks together to start the car, which action is cushioned by the action of the reducing valve as controlled by the compression spring therein and serves to gradually clamp the disks together to start the car without shock, the clamping of the clutch being graduated by the slipping of the disks among each other, and the resilience of the compressed air, and is further modified by the action of the reducing valve and its controlling spring.

When it becomes necessary or desirable to increase the air pressure, either for starting the car or more quickly increasing its speed, the operating lever is rotated farther in the same direction to bring into play the auxiliary spring which supplements the action of the reducing-valve spring and still further increases and at the same time cushions the pressure of air which may pass through the reducing valve. When the grip of the slow speed clutch has started the car and imparted the maximum speed of this clutch, the operating lever is rotated in the reverse direction, which first permits an exhaust of the compressed air between the diaphragms of the low speed clutch and then supplies compressed air to the diaphragm of the high speed clutch in the same manner as above described for the low speed clutch, and it is evident that the grip of the high speed clutch can be gradually increased as described for the grip of the low speed clutch, until the car has attained the maximum speed, and, if it has been found necessary to rotate the lever to bring into play the auxiliary spring, the lever may then be released far enough to relieve the reducing valve from the action of the presser foot, and the car will then run with an air pressure controlled only by the spring of the reducing valve. In event it should be necessary to again augment the speed, or to use more power as for an ascending grade, the operating lever may be again rotated to bring into play the auxiliary spring to increase the grip of the clutch.

I claim:

1. A multiple disk clutch including a shaft; a driving member keyed on the shaft and having a driving head feathered thereon, there being apertures in the head with wooden blocks therein protruding from one side of the head and an inflatable diaphragm on the other side of the head; a driven member journaled on the shaft and having a cylindric case with a head on one end and an inturned metal flange on the other end, the flange overlapping the driving head and abutting the wooden blocks thereof; a plurality of driving disks feathered on the driving member and having apertures with wooden blocks therein; a plurality of metal driven disks feathered in the case intervening between the driving disks and abutting wooden blocks thereof; and an abutment ring composed of wooden blocks abutting the diaphragm and a metal backing abutting the wooden blocks of the adjacent driving disk.

2. A multiple disk clutch including a shaft; a driving member keyed on the shaft and having a driving head feathered thereon, there being apertures in the head with wooden blocks therein protruding from one side of the head and an inflatable diaphragm on the other side of the head; a driven member journaled on the shaft and having a cylindric case with a head on one end and an inturned metal flange on the other end, the flange overlapping the driving head and abutting the wooden blocks thereof; a plurality of driving disks feathered on the driving member and having apertures with wooden blocks therein; a plurality of metal driven disks feathered in the case intervening between the driving disks and abutting wooden blocks thereof; whereby an inflation of the diaphragm clamps the parts together.

3. A multiple disk clutch including a shaft; a driving member keyed on the shaft and having a driving head feathered thereon, there being an inflatable diaphragm on one side of the head; a driven member journaled on the shaft and having a cylindric case with a head on one end and an inturned flange on the other end, the flange overlapping the other side of the driving head; a plurality of driving disks feathered on the driving member; a plurality of metal driving disks feathered in the case and intervening between the driving disks; and an abutment ring between the diaphragm and the adjacent driving disk.

4. A multiple disk clutch including a shaft; a driving member keyed on the shaft and having a driving head feathered thereon, there being an inflatable diaphragm on one side of the head; a driven member journaled on the shaft and having a cylindric case with a head on one end and an inturned flange on the other end, the flange overlapping the other side of the driving head; a plurality of driving disks feathered on the driving member; a plurality of metal driving disks feathered in the case and intervening between the driving disks; whereby an inflation of the diaphragm clamps the parts together.

5. In combination, two pneumatic clutches, an air valve adapted to communicate alternately with each clutch, a spring controlled reducing valve between the air valve and each clutch and supplemental spring cushioned controlling means for each reducing valve.

6. In combination, two pneumatic clutches, an air valve adapted to communicate alternately with each clutch, a spring controlled reducing valve between the air valve and each clutch and supplemental controlling means for each reducing valve.

7. In combination, two pneumatic clutches, an air valve adapted to communicate alternately with each clutch, a spring controlled reducing valve between the air valve and each clutch, with means for exhausting from either or both of the clutches when the air valve is closed thereto.

8. In combination, a pneumatic clutch, an air valve communicating with the clutch, a spring controlled reducing valve between the clutch and the air valve, and supplemental spring cushioned controlling means for the reducing valve.

9. In combination, a pneumatic clutch, an air valve communicating with the clutch, a spring controlled reducing valve between the clutch and the air valve, and supplemental controlling means for the reducing valve.

J. A. VIELE.

Witnesses:
FRANK M. KNAPP,
RALPH N. BROWN.